United States Patent
Baek et al.

(10) Patent No.: US 12,099,566 B2
(45) Date of Patent: Sep. 24, 2024

(54) CONTENT TYPE EMBEDDINGS

(71) Applicant: Dropbox, Inc., San Francisco, CA (US)

(72) Inventors: Jongmin Baek, Millbrae, CA (US); Jiarui Ding, Foster City, CA (US); Neeraj Kumar, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 1039 days.

(21) Appl. No.: 16/675,671

(22) Filed: Nov. 6, 2019

(65) Prior Publication Data
US 2021/0089822 A1     Mar. 25, 2021

Related U.S. Application Data

(60) Provisional application No. 62/904,677, filed on Sep. 23, 2019.

(51) Int. Cl.
| | |
|---|---|
| *G06N 20/10* | (2019.01) |
| *G06F 16/957* | (2019.01) |
| *G06F 18/2413* | (2023.01) |
| *G06N 3/047* | (2023.01) |
| *G06N 3/08* | (2023.01) |
| *G06N 7/01* | (2023.01) |

(Continued)

(52) U.S. Cl.
CPC .... *G06F 16/9577* (2019.01); *G06F 18/24137* (2023.01); *G06N 3/047* (2023.01); *G06N 3/08* (2013.01); *G06N 7/01* (2023.01); *G06N 20/10* (2019.01); *G06V 10/764* (2022.01); *G06V 10/82* (2022.01); *G06F 16/178* (2019.01); *G06F 16/24573* (2019.01)

(58) Field of Classification Search
CPC .......... G06F 16/9577; G06F 18/24137; G06F 16/24573; G06F 16/178; G06N 20/10; G06N 3/047; G06N 7/01; G06N 3/08; G06V 10/82; G06V 10/764
See application file for complete search history.

(56) References Cited

U.S. PATENT DOCUMENTS

| | | | |
|---|---|---|---|
| 8,825,188 | B2 | 9/2014 | Stone et al. |
| 9,037,464 | B1 | 5/2015 | Mikolov et al. |

(Continued)

OTHER PUBLICATIONS

Mauthe, A., et al, Professional Content Management Systems: Handling Digital Media Assets, Retrieved from Internet:<https://books.google.com/books?hl=en&lr=&id=WgYZBiwZYgC&oi=fnd&pg=PR5&ots=NsZB-QeV3o&sig=-qlhW55xvVhJsPfEYq1I3LkCFng#v=onepage&q&f=false> (Year: 2004).*

(Continued)

*Primary Examiner* — Miranda M Huang
*Assistant Examiner* — Bart I Rylander
(74) *Attorney, Agent, or Firm* — Keller Preece PLLC

(57) ABSTRACT

Techniques for learning and using content type embeddings. The content type embeddings have the useful property that a distance in an embedding space between two content type embeddings corresponds to a semantic similarity between the two content types represented by the two content type embeddings. The closer the distance in the space, the more the two content types are semantically similar. The farther the distance in the space, the less the two content types are semantically similar. The learned content type embeddings can be used in a content suggestion system as machine learning features to improve content suggestions to end-users.

20 Claims, 5 Drawing Sheets

(51) Int. Cl.
  *G06V 10/764* (2022.01)
  *G06V 10/82* (2022.01)
  *G06F 16/178* (2019.01)
  *G06F 16/2457* (2019.01)

(56) References Cited

U.S. PATENT DOCUMENTS

| | | | |
|---|---|---|---|
| 10,331,976 | B2 | 6/2019 | Akata et al. |
| 2017/0132510 | A1 | 5/2017 | Paluri et al. |
| 2017/0357896 | A1 | 12/2017 | Tsatsin et al. |

OTHER PUBLICATIONS

Globerson, A et al, Euclidean Embedding of Co-occurrence Data, [retrieved Jan. 20, 2023]. Retrieved from Internet:<https://proceedings.neurips.cc/paper/2004/hash/ec1f850d934f440cfa8e4a18d2cf5463-Abstract.html> (Year: 2004).*

Bordawekar, R. et al, Cognitive Database: A Step towards Endowing Relational Databases with Artificial Intelligence Capabilities, [retrieved Jan. 20, 2023]. Retrieved from Internet:<https://arxiv.org/abs/1712.07199> (Year: 2017).*

Buzydlowski, et al Term Co-occurrence Analysis as an Interface for Digital Libraries, [retrieved Jan. 23, 2023]. Retrieved from Internet:<https://link.springer.com/chapter/10.1007/3-540-36222-3_10> (Year: 2002).*

Beebe, et al, "Sceadan: Using Concatenated N-Gram Vectors for Improved File and Data Type Classification" [retrieved Jan. 23, 2023]. Retrieved from Internet:<https://ieeexplore.ieee.org/abstract/document/6567922/> (Year: 2013).*

Calhoun, et al "Predicting the types of file fragments" [retrieved Jan. 23, 2023]. Retrieved from Internet:<https://www.sciencedirect.com/science/article/pii/S1742287608000273> (Year: 2008).*

Chen, et al "Joint Text Embedding for Personalized Content-based Recommendation" [retrieved Jan. 23, 2023]. Retrieved from Internet:<https://arxiv.org/abs/1706.01084> (Year: 2017).*

Song, et al "Relationship Extraction Methods Based on Co-occurrence in Web Pages and Files" [retrieved Jan. 23, 2023]. Retrieved from Internet:<https://dl.acm.org/doi/abs/10.1145/2095536.2095552> (Year: 2011).*

Sprugnoli, et al "The Content Types Dataset: a New Resource to Explore Semantic and Functional Characteristics of Texts" [retrieved Jan. 23, 2023]. Retrieved from Internet:<https://aclanthology.org/E17-2042/> (Year: 2017).*

Grover, A., et al, node2vec: Scalable Feature Learning for Networks, Retrieved from Internet:<https://dl.acm.org/doi/abs/10.1145/2939672.2939754> (Year: 2016).*

Mauthe, A., et al, Professional Content Management Systems: Handling Digital Media Assets, Retrieved from Internet:<https://books.google.com/books?hl=en&lr=&id=WgYZBiwZYgC&oi=fnd&pg=PR5&ots=NsZB-QeV30&sig=-qlhW55xvVhJsPfEYq1I3LkCFng#v=onepage&q&f=false> (Year: 2004).*

Gupta, S., et al, DOM-based Content Extraction of HTML Documents, Retrieved from Internet:<https://dl.acm.org/doi/abs/10.1145/775152.775182> (Year: 2003).*

Ding, Y., et al, Recency-Based Collaborative Filtering, Retrieved from Internet:<chrome-extension://efaidnbmnnnibpcajpcglclefindmkaj/https://crpit.scem.westernsydney.edu.au/confpapers/CRPITV49Ding.pdf> (Year: 2006).*

Xing et al., "Incorporating Metadata into Content-Based User Embeddings", Proceedings of the 3rd Workshop on Noisy User-generated Text, 5 pages, Copenhagen, Denmark, dated Sep. 7, 2017.

Pennington et al., "GloVe: Global Vectors for Word Representation", Proceedings of the 2014 Conference on Empirical Methods in Natural Language Processing, dated Oct. 2014, 12 pages.

Grover et al., "node2vec: Scalable Feature Learning for Networks", KDD '16, dated Aug. 13-17, 2016, San Francisco, CA, USA, 10 pages.

* cited by examiner

CONTENT TYPE EMBEDDINGS

BENEFIT CLAIM

This application claims the benefit of U.S. provisional application Ser. No. 62/904,677, filed Sep. 23, 2019, the entire contents of which is hereby incorporated by reference.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

Some embodiments relate computer-implemented techniques for learning and using content type embeddings.

BACKGROUND

Content management systems including centrally-hosted network file systems are a popular way for end-users (e.g., businesses, organizations, and individuals) to store their digital content in addition to or instead of storing the digital content on personal computing devices. These systems may offer other features to end-users in addition to a content hosting feature. For example, such systems may offer the ability to synchronize changes to the hosted content between network-connected devices, the ability to share content over a network with different users, or the ability to collaborate on the authoring of content.

These systems may employ machine learning to help end-users manage their content with the systems. In particular, a machine learning model (e.g., a linear support vector machine, a neural network, etc.) may be used to make predictions about content. As just one example, a machine learning model might be used to predict a target folder in the network file system to suggest to an end-user as a suitable location for containing content that the end-user has requested be moved or copied within the network file system.

When making a prediction about content, a machine learning model may take the content type of the content into account as an input machine learning feature (predictor). Returning to the target folder prediction example above, a machine learning model may take into account the content type of content to be moved or copied as an input feature on the premise that the same type of content is likely to be stored by users in like network file system locations. For example, an end-user may store all of his or her digital photos under a "Photos" folder or the like in the network file system.

A technical challenge is training a machine learning model that uses content type as a feature to make accurate predictions for given content. This challenge is especially acute for relatively rare content types such as, for example, a content type that occurs relatively infrequently among all content hosted with the content management system. In this case, there may be relatively few examples available of end-user behavior with the rare content type to learn form. Consequently, the training set on which a machine learning model is trained to make predictions may not be representative of end-user behavior with the rare type of content. For example, the training set may have sampling noise with respect to the rare content type. As result, when making predictions about content of the rare content type, the machine learning model may not generalize well.

Consider an example. One type of content that is sometimes referred to as a "CDR file" is a vector graphics digital image encoded and compressed for processing by a particular vector editing software program. Among all hosted content for all users, occurrences of CDR file content may be rare. For example, there might be only a few examples of a user uploading, synchronization, opening, editing, moving, or copying CDR file content within the network file system. Further, those few examples might not be representative of how users would typically move or copy CDR file content within the network file system. For example, the few examples may be associated with a single user that interacted CDR file content within the network file system for reasons particular to the user's situation that are not generally applicable to other users that move or copy CDR file content.

Overall, while content type can be a useful machine learning feature for making machine learning model-based predictions about end-user behavior with content, the training set on which the machine learning model is trained may have sampling noise with respect to rare content types such that the machine learning model is not able to generalize well (e.g., overfits) when making predictions for content of a rare content type.

Some embodiments of the present invention address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

DETAILED DESCRIPTION

Figure 1:
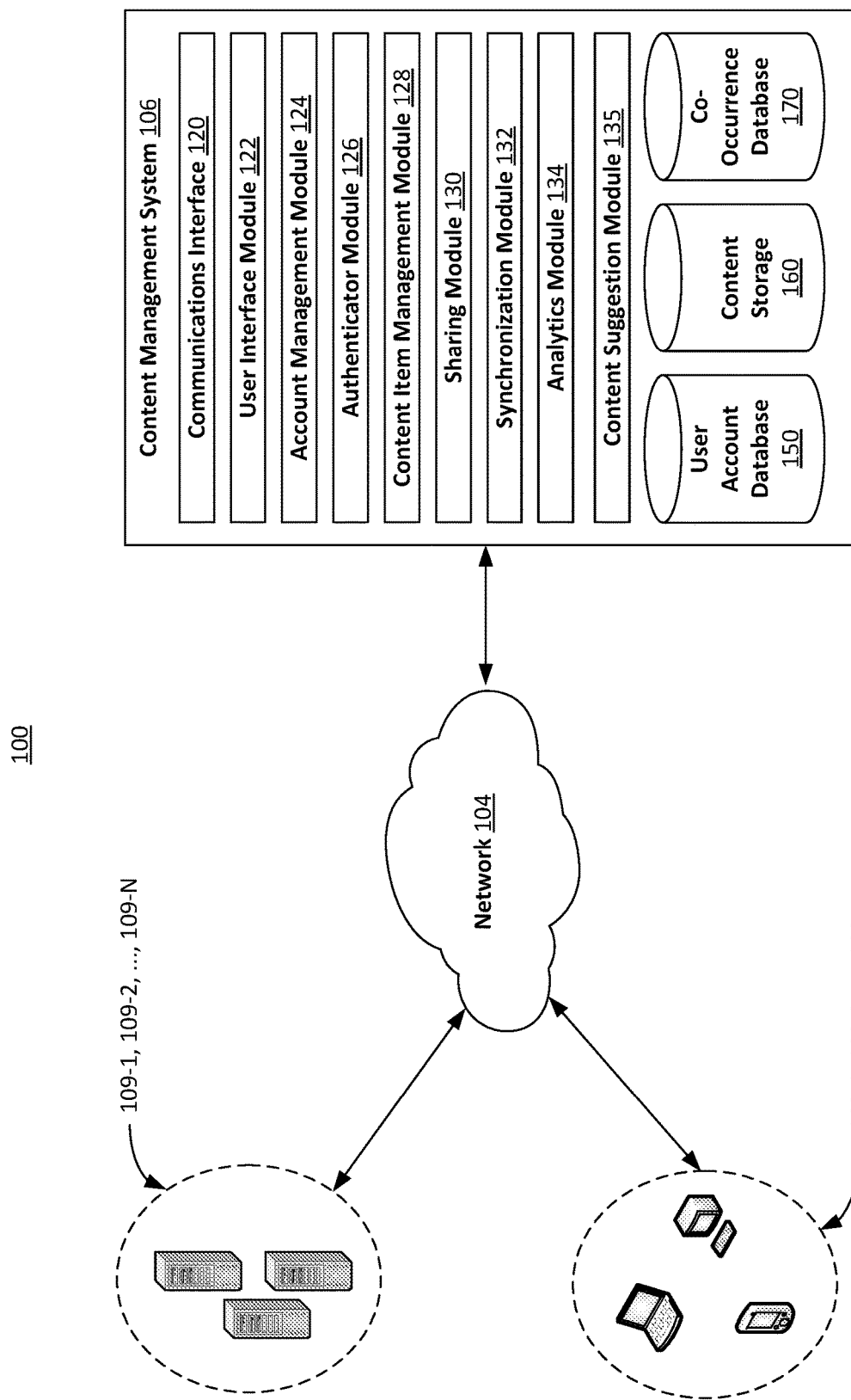
FIG. 1 illustrates an example content management system environment, according to some embodiments.

In the following description, for the purposes of explanation, numerous specific details are set forth in order to provide a thorough understanding of some embodiments of the present invention. It will be apparent, however, that some embodiments of the present invention may be practiced without these specific details. In other instances, some structures and devices are shown in block diagram form in order to avoid unnecessarily obscuring some embodiments of the present invention.

General Overview

Techniques for learning and using embeddings for content types are disclosed. A content type embedding represents a discrete type of computer stored or computer network transmitted content. For example, a content type embedding may represent a file type or a media type. A content type embedding is represented in a computer as a vector of floating-point numbers in a multi-dimensional embedding space. As part of regularization of the learning techniques, each of the floating-point numbers in the vector may be constrained to be within a range such as, for example, negative one (−1) to positive one (+1), or at least the mean and variance of the floating-point numbers of the vector may be constrained to be within a range. Accordingly, as used hereinafter, the term "content type embedding" refers to such a vector learned for a respective content type. The term "content type embeddings" refers to a set of such vectors where each vector in the set is learned for a different respective content type.

According to some embodiments, the dimensionality of the content type embeddings learned and used according to techniques disclosed herein may be relatively low compared to other types of embeddings (e.g., word embeddings). For example, the dimensionality of the content type embedding may be around six or seven for encoding approximately one thousand different content types. However, no particular dimensionality is required of the content type embeddings and the dimensionality may be selected according to the requirements of the particular implementation at hand. For example, the dimensionality may be selected empirically as the smallest dimensionality that retains sufficient information about the semantic similarities between the set of content types to be embedded where what is considered sufficient information may vary according to the requirements of the particular implementation at hand, including based on the cardinality of the set of content types to be embedded by the learning techniques. According to some embodiments, the dimensionality of the content type embeddings is as low as three for embedding approximately one thousand different content types, but may be higher in a particular implementation.

The content type embeddings have the useful property that a distance in the embedding space between any two content type embeddings in the embedding space corresponds to the semantic similarity between the two content types represented by the two content type embeddings. The closer the distance in the space, the more the two content types are semantically similar. The farther the distance in the space, the less the two content types are semantically similar. The distance between the two vectors may be measured according to an embedding distance measure such as, for example, a cosine similarity of the two content type embeddings or a Euclidean distance between the two content type embeddings.

According to some embodiments, the content type embeddings are learned based on various signals detected in a content management computing system (sometimes referred to herein as just "content management system"). The various signals reflect co-occurrences of content types in the content management system. As a result of learning the content type embeddings based on the co-occurrence signals, the distance in the embedding space between content type embeddings learned for content types that frequently co-occur in the content management system is closer reflecting greater semantic similarity between the frequently co-occurring content types than the distance in the embedding space between content type embeddings learned for content types that do not as frequently co-occur in the content management system reflecting less semantic similarity.

The learned content type embeddings can be used for various purposes. According to some embodiments, the learned content type embeddings are used in a content suggestion computing system (sometimes referred to herein as a "content suggestion system")—which may be a component of the content management system—to predict content that an end-user might be interested in. In particular, the prediction is made using a machine learning content suggestion model (sometimes referred to herein as just "content suggestion model"). The content suggestion model is trained using the content type embeddings as machine learning features (sometimes referred to herein as just "features" or as "predictors") of the learning examples (sometimes referred to herein as "training examples"). The content type embeddings may be one of multiple features based on which the content suggestion model is trained. By training the content suggestion model based on the content type embeddings, the content suggestion model can better generalize when making predictions for content of a rare content type by leveraging the content suggestion model's ability to generalize well when making predictions for content of a common content type that is semantically similar to the rare content type according to the learned content type embeddings for the rare content type and the common content type. Thus, the techniques disclosed improve the operation and functionality of content suggestion systems that use a content suggestion model where the content suggestion model is trained using the content type embeddings as features of the learning examples and where the content type embeddings are used as features input to the machine learning content suggestion model when making predictions about content.

The content management system may host content of many different content types (e.g., 99% of the different content types may include hundreds or thousands of different content types). As such, it may not be practical or desirable to learn a separate content suggestion model for each different content type. A benefit the disclosed techniques is that the content type embeddings facilitate learning and use of a single or fewer content suggestion model(s) for suggesting content of different content types. The content type embeddings facilitate this by having the property that the distance in the embedding space between any two content type embeddings in the embedding space corresponds to the semantic similarity between the two content types represented by the two content type embeddings. Because of this property, a single content suggestion model can reflect the semantic similarities between different content types.

These and other improvements to content management and content suggestion systems may be provided by the disclosed techniques for learning and using the content type embeddings.

Content Type Embedding Learning Goal

Some embodiments represent content types in the content management system as content type embeddings. A content type embedding is a numerical representation of a content type in which pairwise distances between the content type embeddings are representative of the semantic similarity between content types. In particular, as the pairwise distance increases between two content type embeddings, the semantic similarity decreases between the represented content types. And as the pairwise distance decreases between two content type embeddings, the semantic similarity increases between the represented content types.

Assume the content management system hosts content items encompassing a set of N number of different content types $X=\{ct_1, \ldots, ct_N\}$. According to some embodiments, each of the N number of different content types corresponds a different file type, media type, or the like. A goal of learning content type embeddings, then, is to determine $\{E:X \to \mathbb{R}^K\}$ such that $\|E(ct_i)-E(ct_j)\|$ is smaller as the two content types $ct_i$ and $ct_j$ are more semantically similar and larger as the two content types are less semantically similar. Techniques for learning such content type embeddings are disclosed herein.

Content Items and Content Types

As used herein, a "content item" refers to discrete digital content and potentially any embedded or associated metadata. By discrete, it is meant that the digital content is identifiable or addressable in the content management system separate from other digital content that is identifiable or addressable in the content management system such as, for example, by a file identifier, a folder identifier, a Uniform Resource Indicator (URI) (e.g., a Uniform Resource Locator (URL)), one or more identifiers of one or more data blocks that make up the digital content, one or more identifiers of one or more database records containing the digital content, or one or more identifiers of one or more data containers of the digital content.

For example, a content item can correspond to a file, a folder, a web page, an online document (e.g., an online word processing or spreadsheet document), a digital photo, a digital image, digital data, text, digital audio, digital video, streaming content, etc. A content item can refer to a collection for grouping content items together such as, for example, a folder, an audio or video playlist, or a photo album. Thus, a content item can logically contain other content items in the content management system.

A content item can have a content type. A content item is not limited to having only one content type and may have multiple content types. There are various ways to define a type of the content item. According to some embodiments, a content type of a content item corresponds to a file type or a media type of the content item.

A file type of the content item may be represented by a file extension of the content item. Some common file extensions that may each correspond to a different content type include all of the following file extensions, a subset of these file extensions, or a superset thereof:

Images (.gif, .jpg, .png, .ico)
Word Processing (.doc, .docx, .docm, .dotx, .dotm)
Spreadsheet (.xls, .xlsx, .xlsm, .xltx, .xltm)
Presentation (.ppt, .pptx, .pps, .ppsx, .pptm, .potx, .potm)
Adobe™ Acrobat™ (.pdf)
HTML (.htm or .html)
Text (.txt, .rtf)
Zip (.zip)
Audio (.wav, .mp3)
Video (.mpg, .mpeg, .avi, .qt, .mov, .MP4, .M4v)
Javascript (.js)
Stylesheet (.css)
Archives (.zip, .rar., .gz)

A media type of a content item may be represented by the two-part identifier assigned to the media type by the Internet Assigned Numbers Authority (IANA). A current list of media types and their associated two-part identifiers is available on the Internet at /assignments/media-types/media-types.xhtml in the iana.org domain, the entire contents of which is hereby incorporated by reference. Some common media types that may each correspond to a different content type include all of the following media types, a subset of these media types, or a superset thereof:

application/javascript
application/json
application/x-www-form-urlencoded
application/xml
application/zip
application/pdf
application/sql
application/graphql
application/ld+json
application/msword
application/vnd.openxmlformats-officedocument.
  wordprocessingml.document
application/vnd.ms-excel
application/vnd.openxmlformats-officedocument.spreadsheetml.sheet
application/vnd.ms-powerpoint
application/vnd.openxmlformats-officedocument.presentationml.presentation
application/vnd.oasis.opendocument.text
application/zstd
audio/mpeg
audio/ogg
multipart/form-data
text/css
text/html
text/xml
text/csv
text/plain
image/png
image/jpeg
image/gif
application/vnd.api+json While in some embodiments a content type of a content item corresponds to a file type or a media type of the content item, the content type of the content item can be defined in other ways. For example, a content type of a content item can be one in a sparse set of major content types such as, for example, texts, images, videos, etc., or one in a more fine-grained set of content types such as, for example, raw texts, web documents, source code, word processing content, etc.

Content Type Semantic Similarity

In some embodiments, two content types are semantically similar if they are used by end-users for a similar purpose. For example, JPEG content items and PNG content items are both digital image formats that are often used by end-users relatively interchangeably such as, for example, in authoring web content or in a photo editing computer application.

In some embodiments, two content types are semantically similar if they are processed by the same computing application. For example, Python programming language files (.py files) and compiled versions of the Python programming language files (.pyc files) are processed by the Python runtime interpreter.

In some embodiments, two content types are semantically similar if their associated file extensions are similar. For example, the file extensions ".jpeg" and ".jpg" often refer to the same content type, namely JPEG.

A content type of a content item may be particularly informative for various machine learning tasks such as a machine learning task to predict a content item relevant to an end-user based on a content type of the content item. Unfortunately, there may be a large number of different content types. For example, as of Sep. 3, 2019, the Internet Assigned Numbers Authority (IANA) recognized over 1,300 different application content types, over 150 different digital audio content types, over 70 different digital image content types, and over 80 different video content types. Further, within the content management system, the distribution of different content types among the content items hosted by the content management system may be heavy-tailed. For example, 99% of the content items hosted by the content management system may encompass over three hundred different content types.

For a machine learning task, it is possible to represent a particular content type as a one-hot vector where the one-hot vector, assuming no vector compression, has an element for each different possible content type, the element for the particular content type is one and zeroes for every other element, e.g., $\{E:X_i \mapsto \{0, \ldots, 0, 1, 0, \ldots, 0\} \in \mathbb{R}^N\}$ for each different content type i. However, the machine learning task may not have a sufficient number of training examples for rare content types, presenting a technical challenge to learn a model that can make reasonable predictions for rare content types. A one-hot encoding of content types does may not encode any notion of similarity between content types.

Some embodiments of the present invention address this and other issues by learning content type embeddings that enable, among other things, machine learning models to make accurate predictions for rare content types.

Co-Occurrence Data

According to some embodiments, the content type embeddings are learned based on co-occurrence data collected by the content management system. The co-occurrence data may contain useful signals on the semantic similarities between different content types. In particular, instances of co-occurrence of different content types in various contexts in the content management system may be indicative of semantic similarity between the different content types. For example, if two content items are located in the same network filesystem folder of the content management system, then their respective content types may be semantically similar on the premise that a folder is a useful mechanism to organize related content together. Analogously, if two content items are uploaded or synchronized together in the same upload or synchronization session, then their respective content types may be semantically similar. Likewise, if two content items are shared with an end-user in the same sharing operation, then their respective content types may be semantically similar. According to some embodiments, semantic similarities of content types are determined based on co-occurrence instances of the content types in the content management system.

Folder Co-Occurrence Instances

According to some embodiments, a co-occurrence instance of two content types occurs if a folder in the content management system contains content items and at least one of the content items in the folder is one of the two content types and at least one other of the content items in the folder is the other of the two content types. For example, the content management system may maintain a database that represents a centrally-hosted network filesystem. The database may store the network filesystem folder locations of content items such that it can be determined from the database the content items that are contained in a given network filesystem folder at a particular time. If the network filesystem is hierarchical, then, for purposes of counting co-occurrence instances, a content item may be considered to be contained only in its immediate parent folder and not contained in any further ancestor folders in the network filesystem hierarchy. For example, if content item C is contained in folder /F1/F2/F3 where F1 is the name of a root folder in the network filesystem hierarchy, F2 is the name of a child folder contained in folder F1, F3 is the name of a child folder contained in folder F2, and content item C is contained in folder F3, then content item C may be considered to be contained in folder F3 but not contained in either folders F2 or F1 for purposes of counting co-occurrence instances.

Since the content management system may allow end-users to move content items between different folders or delete content items from folders, a co-occurrence of two content types is counted in some embodiments only if content items of the two content types are contained in a folder for at least a threshold amount of time such as may be determined based on a last modified timestamp associated with the folder or a timestamped event history log associated with the folder that records content item move and delete events along with the times the events took place. The threshold amount of time can be selected based on the requirements of the particular implementation at hand but generally should be long enough such that transient content items contained in the folder are not included in the co-occurrence instance counts. A transient content item might be one that is mistakenly moved into the folder for a short period of time (e.g., less than a few minutes). Likewise, a transient content item might be one that is created in the folder and then subsequently moved out of the folder or deleted from the folder within the threshold amount of time. Analogously, a content item that is accidently deleted from a folder and then subsequently restored to the folder within the threshold amount of time may be included in the co-occurrence instance counts as if it were never accidently deleted.

Upload or Synchronization Co-Occurrence Instances

According to some embodiments, a co-occurrence instance of two content types occurs if an end-user of the content management system uploads or synchronizes content items (or portions thereof) in the same upload or synchronization session and at least one of the content items uploaded or synchronized in the session is one of the two content types and at least one other of the content items uploaded or synchronized in the session is the other of the two content types. For example, a database of the content management system may log content item upload or synchronization events and co-occurrence instances can be determined from this database. An upload or synchronization session may encompass sending one or more content items or portions (e.g., blocks) thereof over a data communications network (e.g., the Internet) from an end-user computing device to one or more servers of or operated by the content management system. No particular time length of a session is required, and sessions can be of various different time lengths (e.g., seconds, minutes, days, weeks, etc.) In general, however, a given session will be associated with a particular end-user computing device and a particular end-user, or the particular end-user's user account held with, or used to authenticate to, the content management system.

According to some embodiments, an upload or synchronization session is initiated by an end-user computing device in response to an event detected at the end-user computing device that indicates that one or more content items or portions (e.g., blocks) thereof should be sent from the end-user computing device to the content management system. For example, the event detected at the end-user computing device may be a user input event at the end-user computing device such as, for example, a user input event commanding the end-user computing device to initiate the upload or synchronization session. As another example, the event detected at the end-user computing device may be detecting a change or edit to a content item or content items stored at the end-user computing device such that the change or edit should be uploaded to or synchronized with the content management system. As yet another example, the event detected at the end-user computing device may be receiving a notification (e.g., a ping) over a data communications network from a server of the content management system that indicates that new content items or updates to content items are available from the content management system. In response to receiving the notification, the end-user computing device may initiate an upload or synchronization session to send any new content items, or portions thereof, or any new updates to content items, or portions thereof, stored at the end-user computing device to the content management system and also receive the new content items, or portions thereof, or updates to content items, or portions thereof, available from the content management system.

Sharing Co-Occurrence Instances

According to some embodiments, a co-occurrence instance of two content types occurs if an end-user of the content management system shares content items in the same share operation and at least one of the content items of the share operation is one of the two content types and at least one other of the content items in the share operation is the other of the two content types. A share operation may involve a "sharing" end-user commanding the content management system to share content items or a folder of content items selected by the end-user with one or more other "target" end-users of the content management system. By sharing the content items with the target end-user(s), the target end-user(s) have a level of access to the content items through the content management system they did not have before the share operation completed. For example, the shared content items may be downloaded or synchronized to the target end-user's computing device(s) or the target end-user(s) may be able to access the shared content items through the content management system.

Co-Occurrence Instance Matrix

Based on the co-occurrence data and the co-occurrence instances identified therefrom, an N-by-N co-occurrence instance matrix $\beta$ can be generated where each entry (i,j) in matrix $\beta$ equals the number of co-occurrence instances involving content type $ct_i$ and content type $ct_j$ determined from the co-occurrence data. N represents the number of different content types for which content types embeddings are being learned. If matrix $\beta$ is a sparse matrix having non-diagonal zero-valued entries or non-diagonal entries with co-occurrence instance counts below a minimum threshold, the matrix $\beta$ may be represented in a computer in a compact or compressed form such as by using a triplet array representation or a linked list representation.

The co-occurrence data on which matrix $\beta$ is generated may span a particular period of time such as, for example, a past historical window of time such as, for example, a past number of days, weeks, months, or years. The co-occurrence data may pertain to all end-users using the content management system during the particular period of time, or a subset of all the end-users. However, no particular set of co-occurrence data is required and the co-occurrence data on which matrix $\beta$ is generated may be based on a sampling (e.g., a random sampling, sampling by user account, etc.) of co-occurrence data collected by the content management during a period of time (e.g., the past year).

It should be noted that no particular type of co-occurrence instance or types of co-occurrence instances is required of matrix $\beta$ and what is considered a co-occurrence instance in the content management system may vary from implementation to implementation according to the requirements of the particular implementation at hand and the co-occurrence data that is available. For example, both folder containment co-occurrences and upload or synchronization session co-occurrences can be counted in matrix $\beta$ where the co-occurrence instance counts in matrix $\beta$ do not distinguish between the two types of co-occurrences. For example, the co-occurrence instance count of an entry in matrix $\beta$ may be X where Y of X are folder containment co-occurrence instances and Z of X of are upload or synchronization session co-occurrence instances where X, Y, and Z are integers, X is greater than zero, Y and Z are each greater than or equal to zero, and Y+Z=X. Alternatively, the co-occurrence instance count of an entry in matrix $\beta$ may reflect just folder containment co-occurrence instance or just upload or synchronization session co-occurrence instances.

While co-occurrence instances need not be weighted, different types of co-occurrence instance counts can be numerically weighted differently depending on how indicative of semantically similarity they are. For example, folder containing co-occurrence instance counts can be weighted numerically less or numerically more than upload or synchronization co-occurrence instance counts are numerically weighted depending on which type of co-occurrence instance counts are more representative of semantically similarity between content types. Thus, a co-occurrence instance count, as referred to herein, encompasses both non-weighted and weighted count values. As such, a co-occurrence instance count can be an integer value encompassing whole number weighted or non-weighted count values or a floating-point value encompassing fractional count values.

Thus, the above described types of co-occurrence instances should be viewed as merely examples of possible types of co-occurrence instances and virtually any type or types of co-occurrence instance(s) in the content management system between content types that is indicative of semantic similarity between the content types may be used.

Diagonal Matrix Entries

The entries of matrix $\beta$ can be zero if a co-occurrence of the same content type is not considered to be a co-occurrence instance. In this case, the diagonal entries of matrix $\beta$ may be excluded from the statistical process for learning content type embeddings. However, it is possible to count a co-occurrence of the same content type as a co-occurrence instance in matrix β. In that case, the diagonal entries may be included in the statistical process. For example, it may be useful to count a co-occurrence of the same content type as a co-occurrence instance in matrix β if the learned content type embeddings are used as input machine learning features to a content suggestion model to predict content of the same content type as given content. For example, the content suggestion model may be used to predict a content item an end-user might wish to open, edit, or otherwise access next, given a content item that the end-user currently is accessing where it is appropriate for the predicted content item to be the same content type as the content type of the content item currently accessed.

Skewed Co-Occurrence Instances

It is possible for a folder in the content management system to contain many more content items of one content type than content items of another content type. For example, a folder may contain 100 content items of a first content type and only 1 content item of a second content type. Similarly, it is possible for an upload or synchronization session to contain many more content items of one content type than content items of another content type. For example, an upload or synchronization session may involve 100 content items of the first content type and only 1 content item of the second content type. In both of these cases, a co-occurrence instance between the first and second content types can be counted. However, the count may be weighted based on the difference between the number of content items of the first content type and the number of content items of the second content type. For example, a "baseline" count of one or approximately one may be given in matrix β to a co-occurrence instance where the number of content items of the first and second content types is equal or approximately equal. However, a count less than one or less than approximately one may be given to a skewed co-occurrence instance where the difference between the numbers of the first and second types of content items is not zero or not approximately zero. For example, the baseline count may be weighted numerically down (toward zero) based on the magnitude difference between the number the numbers of the first and second types of content items. In other embodiments, a count of one is given to a co-occurrence instance regardless of the difference between the number of content items of the first content type and the number of content items of the second content type.

Accounting for Relative Popularity

Some content types may co-occur in the content management system much more frequently than other content types. For example, depending on how end-users use the content management system, the co-occurrences of JPEG and PNG content types may be relatively frequent while the co-occurrences for Javascript and Cascading Style Sheet (CSS) content types may be relatively rare. This may be because that are fewer Javascript-type and CSS-type content items hosted with the content management system than there are JPEG-type and PNG-type content items. Thus, it can be expected that co-occurrence instances among more popular content types that are semantically similar can be relative frequent while co-occurrence instances among less popular content types that are nonetheless semantically similar can be relatively infrequency. According to some embodiments, content type embeddings are learned for content types of content items hosted with the content management system while accounting for (normalizing for) the relative popularity of the content types in the content management system, thereby canceling out the individual popularity of the content types, as in the following expression:

$$\text{similarity}(ct_i, ct_j) \propto \frac{\beta_{i,j}}{(\text{popularity of } ct_i) \times (\text{popularity of } ct_j)}$$

In the above, the parameter $\beta_{i,j}$ represents the co-occurrence instance count in matrix β for content type $ct_i$ and content type $ct_j$. The parameter popularity of $ct_i$ is a numerical value representing the popularity of content type $ct_i$ in the content management system. The popularity of a content type can be measured variously. In one way, the popularity of a content type is measured based on a count of the number of content items of the content type in a corpus of content items. With this measure, the popularity of content type $ct_i$ is proportional to the number of content items of content type $ct_i$ in the corpus of content item. The corpus of content items can be all content items hosted with the content management system or a subset thereof. For example, the subset can be all content items for which a co-occurrence instance count is recorded in matrix β, or a subset thereof. The parameter of popularity of $ct_j$ can also be a numerical value but representing the popularity of content type $ct_j$ in the content management system instead of content type $ct_i$. The popularity of content type $ct_j$ can be measured like the popularity of content type $ct_i$ with respect to the same corpus of content items such that the popularities are comparable. Another way to measure the popularity of a content type can be based on a count of the number of times content items of a particular content type are accessed in the content management system during a period of time. For example, the popularity of a content type can be measured as the percentage or ratio of accesses of content items in a set of content items during a period of time that are accesses of the content type.

The above expression for accounting for relative popularity of content types can be formulated in the alternative, as in the following expression:

$$\beta_{i,j} \propto (\text{popularity of } ct_i) \times (\text{popularity of } ct_j) \times \text{similarity}(ct_i, ct_j)$$

This alternative formulation motivates the following generative model for learning the content type embeddings:

$$P((ct_i, ct_j)) \propto P_{unary}(ct_i) \cdot P_{unary}(ct_j) \cdot P_{binary}(ct_i, ct_j)$$

In the above generative model, the parameter $P_{unary}(\cdot)$ represents a probability distribution defined over all content types that captures the relative prevalence of the content type in the content management system. The probability distribution may be modeled variously including, for example, as a normalized Gaussian function centered at zero or as a heavy-tailed distribution such as, for example, a variant of $$\frac{1}{(1+d)}.$$

The parameter $P_{binary}(\cdot, \cdot)$ is solved for during learning of the content type embeddings and represents a binary factor between zero (0) and one (1) that describes how semantically similar the pair of content types are, with a binary factor closer to one (1) indicating greater semantic similarity, and a binary factor closer to zero indicating less semantic similarity.

Generative Process

According to some embodiments, a generative process corresponding to the above-generative model includes the following steps:
Step 1: Sample $ct_i$ from the distribution $P_{unary}$.
Step 2: Sample $ct_j$ from the distribution $P_{unary}$.
Step 3: Accept the pair ($ct_i$, $ct_j$) with probability $P_{binary}$ by flipping a biased coin. If rejected, restart at Step 1. As a special case, always reject $ct_i=ct_j$.
Step 4: Increment the entry in a matrix β In particular, $β_{i,j} \leftarrow β_{i,j}+1$.
Repeat Steps 1-4 until there are a sufficient number of samples.

According to some embodiments, $P_{binary}$ is not a probability distribution. Thus, the accept or reject of the given pair ($ct_i$, $ct_j$) in Step 3 of the generative process effectively samples from a function that is not a true probability distribution.

According to some embodiments, there are a sufficient number of samples when the statistical variance associating with the sampling is small relative to the values in matrix β.

Learning the Content Type Embeddings

According to some embodiments, content type embeddings are learned based on signals on content type semantic similarity such as the signals in co-occurrence data. The signals on content type semantic similarity may be captured in the binary factor as in:

$$P_{binary}(ct_i, ct_j):=f(\|E(ct_i)-E(ct_j)\|)$$

Here, the function f may be some function f: $[0, \infty) \rightarrow (0,1]$ such that $f(0)=1$ and f is monotonically decreasing. The first condition ensures that $P_{binary}(ct_i, ct_i)=1$. In other words, a content type is completely semantically similar to itself. The second condition ensures that the generative model does not generate too many samples for a pair of content types that are semantically dissimilar.

According to some embodiments, the function f is selected as f: $x \mapsto (x^2+1)^{-c}$ for a constant c. In other words, the function f may model a power distribution. By doing so, a number of technical benefits are realized.

First, P (($ct_i$, $ct_j$)) can be expressed in the log-domain as:

$$\log P((ct_i, ct_j))=\log P_{unary}(ct_i)+\log P_{unary}(ct_j)-c\cdot\log (\|E(ct_i)-E(ct_j)\|^2+1)$$

With the log-domain expression, the constant c functions as a configurable parameter that can be adjusted to balance the log-unary term versus the log-binary term as in a multi-term objective.

Second, as the distance between x grows larger, the log probability $\log P((ct_i, ct_j))$ may decelerate its decay. That is, the second-order derivative of log f(x) may be positive while its first-order derivative may be negative.

Third, when the constant c equals 1, then a Student-t distribution is realized. The Student-t distribution is useful for projecting embeddings into a low-dimensional space as described in the paper by Laurens van der Maaten and Geoffrey Hinton, "Visualizing Data using t-SNE," Journal of Machine Learning research 9 (2008) 2579-2605, the entire contents of which is hereby incorporated by reference.

Statistical Formulation

According to some embodiments, matrix β may be drawn from a distribution parameterized by $P_{unary}$, f, and E according to a generative process such as the generative process describe above. In other words, matrix β may be approximated as $P(β|P_{unary}, f, E)$.

A goal of learning content type embeddings may be to find parameters $P_{unary}$, f, and E that explain the observations in matrix β. By Bayes' rule:

$$P(P_{unary}, f, E | β) = \frac{P(β | P_{unary}, f, E) \cdot P(P_{unary}, f, E)}{P(β)}$$

Given the matrix β, learning the content type embeddings may involve maximizing the likelihood of $P(β|P_{unary}, f, E)$. With this, it should be noted that:

$$P(β|P_{unary}, f, E) \propto \Pi_{i \neq j} P((ct_i, ct_j))^{β_{i,j}}$$

Maximizing the log-probability provides:

$$\widehat{P_{unary}}, \hat{f}, \hat{E} = \text{argmax } \Sigma_{i \neq j} β_{i,j} \log P((ct_i, ct_j))$$

In other words:

$$\widehat{P_{unary}}, \hat{f}, \hat{E} = \text{argmax } \Sigma_{i \neq j} β_{i,j} (\log P_{unary}(ct_i) + \log P_{unary}(ct_j) - c \cdot \log(\|E(ct_i)-E(ct_j)\|^2+1))$$

The above optimization may be solved using a standard stochastic gradient descent algorithm or other stochastic optimization algorithm (e.g., Adam optimizer).

Tensorflow Implementation

The following is a Tensorflow™-based implementation in the Python programming language for learning content type embeddings:

```
001: def declare_graph_for_similarity_embedding(N, K):
002:    def get_non_diagonal(t):
003:        assert list(t.shape) == [N, N]
004:        non_diag =
tf.slice(tf.reshape(tf.slice(tf.reshape(t, [N * N]), [1], [N * N - 1]),
[N - 1, N + 1]), [0, 0], [N - 1, N],)
005:        return tf.reshape(non_diag, [(N - 1) * N])
006:
007:    log_unary_potential = tf.Variable(tf.zeros([N]),
name="log_unary_potential")
008:    log_unary_potential_tiled =
tf.tile(tf.expand_dims(log_unary_potential, axis=1), [1, N])
009:
010:    c = tf.get_variable("power_coefficient",
dtype=tf.float32, initializer=[1.0], constraint=lambda t:
tf.clip_by_value(t, 1e-2, 1e1,)
011:
012:    embedding = tf.get_variable("embedding",
dtype=tf.float32, initializer=tf.random_uniform([N, K], minval=-
10.0, maxval=10.0),)
013:
014:    embedding_l2_norms = tf.reduce_sum(embedding *
embedding, axis=1, keepdims=True)
015:    pairwise_embedding_distance = (embedding_l2_norms +
tf.transpose(embedding_l2_norms) - tf.matmul(embedding,
embedding, transpose_b=True) * 2.0)
016:    log_binary_potential = -
tf.log(pairwise_embedding_distance + 1.0) * c
```

-continued

```
017:
018:    log_distro =
_get_non_diagonal(log_unary_potential_tiled +
tf.transpose(log_unary_potential_tiled) + log_binary_potential)
019:    log_distro -= tf.log(tf.reduce_sum(tf.exp(log_distro)))
020:
021:    observations =
_get_non_diagonal(tf.stop_gradient(tf.Variable(tf.zeros([N, N],
dtype=tf.float32), name="observations")))
022:    observations = tf.div(observations,
tf.reduce_sum (observations))
023:
024:    log_likelihood = observations * log_distro
025:    loss = tf.reduce_sum(-log_likelihood, name="loss")
026:
027:    embedding_with_zero_mean = embedding -
tf.reduce_mean(embedding, axis=0, keepdims=True)
028:    tf.div(embedding_with_zero_mean,
tf.reduce_mean(tf.norm(embedding_with_zero_mean, axis=1)),
name="normalized_embedding",)
```

The above Python function defines a Tensorflow graph assuming N number of content types and K-dimensional content type embeddings. The function is governed by the generative model discussed above. Then the loss is formulated to minimize the posterior, in other words, the likelihood of having generated the provided dataset given the model.

The following Python function invokes the above function for generating a Tensorflow graph and uses the generated graph to generate and test content type embeddings:

```
001: def test_run(dataset_file, N=100, K=3, num_iter=20000):
002:    # type: (str, int, int, int) -> ExtEmbedding
003:    # Prepare the data.
004:    count_by_ext, count_by_ext_pair =
load_data_from_csv(dataset_file)
005:    sorted_ext_count = sorted(count_by_ext.items( ),
key=lambda (k, v): v, reverse=True)
006:    top_n_exts, frequency = zip(*sorted_ext_count[ :N])
007:    normalized_frequency = np.array(frequency,
dtype=np.float32) / np.sum(frequency)
008:
009:  with tf.Session(graph=tf.Graph( )) as session:
010:      declare_graph_for_similarity_embedding(N, K)
011:      loss =
tf.get_default_graph( ).get_tensor_by_name("loss:0")
012:      optimizer = tf.train.AdamOptimizer(5e-
2).minimize(loss)
013      tf.global_variables_initializer( ) .run( )
014:
015:      # Initialize the log unary potential to be the
observed distribution.
016:      log_unary_potential =
tf.get_default_graph( ).get_tensor_by_name("log_unary_potential:0")
017:      session.run(tf.assign(log_unary_potential,
np.log(normalized_frequency)))
018:
019:      # Set the observed pairwise counts.
020:      observations =
tf.get_default_graph( ).get_tensor_by_name("observations:0")
021:      session.run(tf.assign(observations,
np.array([[count_by_ext_pair.get((top_n_exts[i], top_n_exts[j]),
0.0) for j in xrange(N)] for i in xrange(N)],
dtype=np.float32,),))
022:
023:      embeddings =
tf.get_default_graph( ).get_tensor_by_name( ... )
024:      for i in range(num_iter):
025:          _, embedding_val, loss_val =
session.run([optimizer, embeddings, loss])
026:      return dict(zip(top_n_exts, np.array(embedding_val))
```

Example Content Management System

With respect to implementing various embodiments of the disclosed technology, an example content management system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of example configuration 100 in FIG. 1 can be implemented in a localized or distributed fashion in a network.

In example configuration 100, end-users can interact with content management system 106 through end-user computing devices $102_1, 102_2, \ldots, 102_n$ (collectively "102") that are regularly, periodically, or intermediately connected to network 104. Content management system 106 can include a single computing device (e.g., a server) or multiple computing devices (e.g., multiple servers) that are configured to perform the functions and/or operations necessary to provide the services described herein.

Content management system 106 can support network communications over network 104 with a variety of different end-user computing devices, such as: desktop computers; mobile computers; mobile communications devices, e.g. mobile phones, smart phones, tablets; smart televisions; set-top boxes; and/or any other network enabled computing devices.

End-user computing devices 102 can be of varying type, capabilities, operating systems, etc. Furthermore, content management system 106 can concurrently communicate with multiple end-user computing devices 102.

An end-user can interact with content management system 106 via a client-side application installed on end-user computing device $102_i$. In some embodiments, the client-side application can include a content management system specific component. For example, the component can be a stand-alone application, one or more application plug-ins, or a web browser extension. However, the end-user can also interact with content management system 106 via a third-party application, such as a web browser, that resides on end-user computing device $102_i$ and is configured to communicate with content management system 106. In either case, the client-side application can present a user interface (UI) for the end-user to interact with content management system 106. For example, the end-user can interact with the content management system 106 via a client-side application integrated with the file system or via a webpage displayed using a web browser application.

Content management system 106 can enable an end-user to store content items, as well as perform a variety of content management tasks, such as retrieve, modify, browse, and/or share the content items. Furthermore, content management system 106 can enable an end-user to access the content from multiple end-user computing devices 102. For example, end-user computing device $102_i$ can upload content to content management system 106 via network 104. Later, the same end-user computing device $102_i$ or some other end-user computing device $102_j$ can retrieve the content from content management system 106.

To facilitate the various content management services, an end-user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more end-user computing devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from end-user computing devices 102 so that end-user computing devices 102 do not need to know exactly where or how the content items are being stored by content management system 106. In some embodiments, content management system 106 can store the content items in the same collection hierarchy as they appear on end-user computing device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more end-user computing devices 102. The synchronization can be platform agnostic. That is, the content items can be synchronized across multiple end-user computing devices 102 of varying type, capabilities, operating systems, etc. For example, end-user computing device 102, can include client software, which synchronizes, via a synchronization module 132 at content management system 106, content in end-user computing device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, an end-user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes end-user computing device $102_i$ may not have a network connection available. In this scenario, the client software can monitor the linked collection for content item changes and queue those changes for later synchronization to content management system 106 when a network connection is available. Similarly, an end-user can manually start, stop, pause, or resume synchronization with content management system 106.

An end-user can view or manipulate content via a web interface generated and served by user interface module 122. For example, the end-user can navigate in a web browser to a web address provided by content management system 106. Changes or updates to content in the content storage 160 made through the web interface, such as uploading a new version of a content item, can be propagated back to other end-user computing devices 102 associated with the end-user's account. For example, multiple end-user computing devices 102, each with their own client software, can be associated with a single account and content items in the account can be synchronized between each of the multiple end-user computing devices 102.

Content management system 106 can include a communications interface 120 for interfacing with various end-user computing devices 102, and can interact with other content and/or service providers $109_1, 109_2, \ldots, 109_n$ (collectively "109") via an Application Program Interface (API). Certain software applications can access content storage 160 via an API on behalf of an end-user. For example, a software package, such as an app running on a smartphone or tablet computing device, can programmatically make calls directly to content management system 106, when an end-user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple end-user computing devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows an end-user to restrict access to the shared content item without having to move the content item or delete the generated URL. Likewise, sharing module 130 can reactivate the URL by again changing the value of the URL active flag to 1 or true. An end-user can thus easily restore access to the content item without the need to generate a new URL.

Content management system 106 may include content suggestion module 135 for suggesting content to end-users. Content suggestion module 135 may generate and provide to an end-user a personalized set of suggested content items that the end-user might be interested in as determined by content suggestion module 135. Here, "personalized" means that the set of suggested content items are selected specifically for the end-user (or the end-user's user account). The personalized set of suggested content items may be provided to an end-user in a user interface presented at the end-user's computing device $120_i$ via the client-side application or a third-party application such as a web browser installed at the end-user's computing device $120_i$. The user interface may include a "Suggested for you" section or the like that displays or otherwise presents the personalized set of suggested content items that the end-user might be interested in. For example, the section may appear on a home web page presented to the end-user after the end-user successfully authenticates to content management system 106 via authenticator module 126.

Content suggestion module 135 may generate the personalized set of suggested content items based on the end-user's account activity with content management system 106 such as, for example, the end-user's content item sharing activity via sharing module 130. A goal of generated the personalized set of suggested content items may be to make it easier for the end-user to find relevant content using content management system 106, including content that the end-user might want to access immediately, as opposed to requiring the end-user to keyword search for the content that the end-user wishes to access immediately. In some embodiments, the personalized set of suggested content items only includes content items that the end-user has access to in content management system 106 which may include content items that the end-user owns (e.g., content items that the end-user uploaded to or synchronized to content management system 106) and content items hosted with content management system 106 that are shared with the end-user by other end-users via sharing module 130.

Co-occurrence database 170 stores co-occurrence data such as the example co-occurrence data described above. The co-occurrence data may include records or log entries that identify or indicate content items and their respective content types that are contained in the same centrally-hosted network filesystem folders, content items and their respective content types that are uploaded or synchronized in the same upload or synchronization session, or content items and their respective content types that are shared as part of the same sharing operation. Co-occurrence data stored in co-occurrence database 170 may be updated as end-users, client-side applications at end-user computing devices 102, or others 109 use or interact with content management system 106 such as via user interface module 122, content item management module 128, sharing module 130, and synchronization module 132.

While content management system 106 is presented with specific components, the architectural configuration of system 106 is simply one possible configuration and that other configurations with more or fewer components are possible.

Content Suggestions Using Content Type Embeddings

According to some embodiments, the personalized set of suggested content items is generated by content suggestion module 135 using a machine learning content suggestion model such as a trained linear support vector machine or a trained neural network. In doing so, content suggestion module 135 may use content type embeddings as machine learning features in determining the personalized set of suggested content items. By doing so, the relevance of the personalized set of suggested content items to the end-user is improved.

Figure 2:
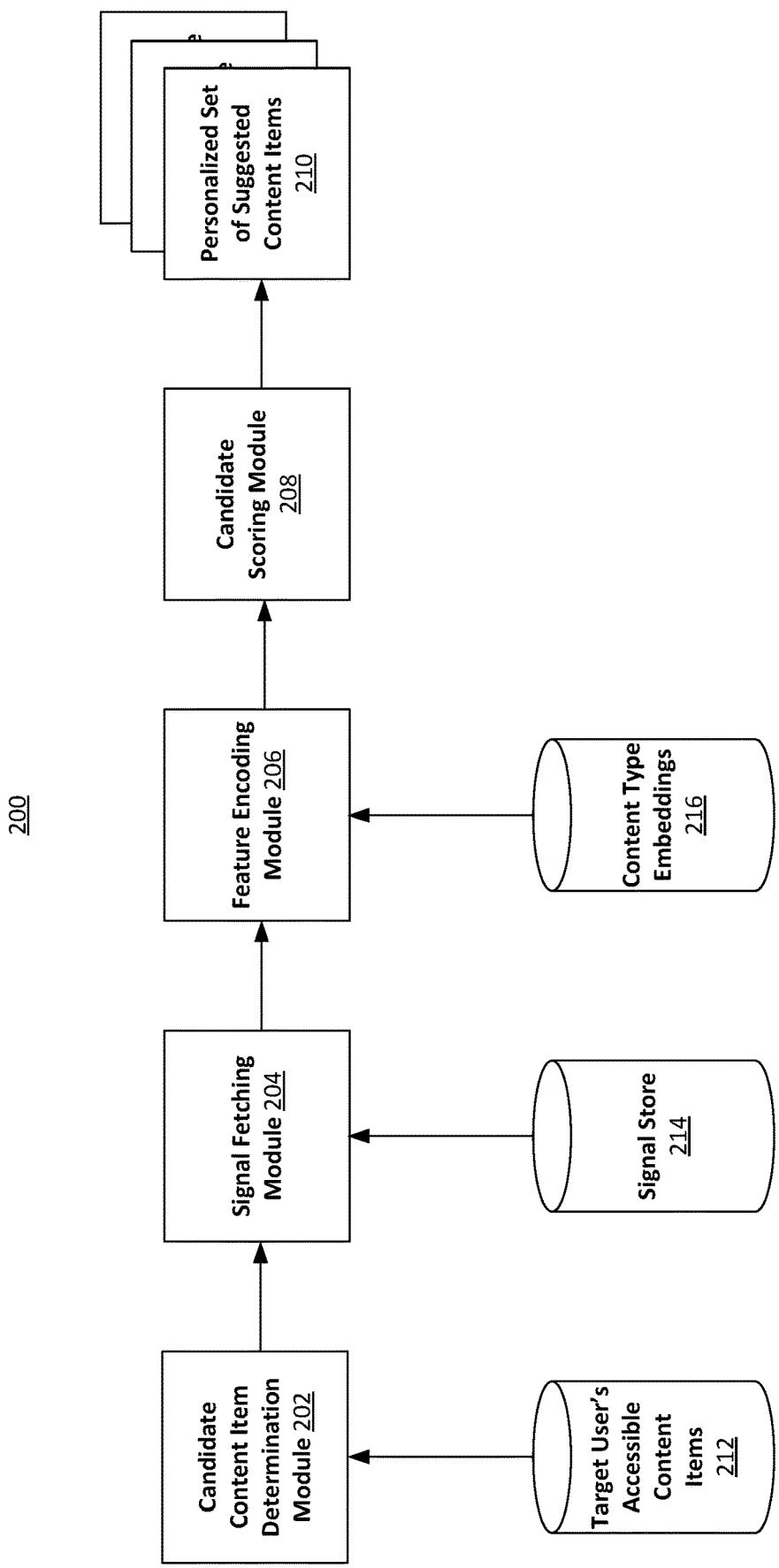
FIG. 2 depicts a content suggestion pipeline that uses a machine learning content suggestion model and content type embeddings to make content suggestions, according to some embodiments.

FIG. 2 depicts example machine learning-based content suggestion pipeline 200 that uses content type embeddings to generate a personalized set of suggested content items 210 for a target end-user, according to some embodiments. Pipeline 200 may be a component of a content management system (e.g., 106). For example, pipeline 200 may be a component of content suggestion module 135 of content management system 106.

Candidate content item determination module 202 obtains a set of candidate content items for scoring and ranking. The set of candidate content items may be selected from a set 212 of all content items accessible to the target end-user in the content management system. For example, the set 212 of content items accessible to the target end-user may include content items the target end-user uploaded to the content management system and content items shared through the content management system with the target end-user by other end-users of the content management system.

Since the set 212 of content items accessible to the target end-user may number into the thousands or even millions, candidate content item determination module 202 may select the set of candidate content items for scoring and ranking as a subset of the set 212 of all content items accessible to the target end-user in the content management system. In this way, a fewer number of content items are scored and ranked by pipeline 200 for computational efficiency with little or no sacrifice in the relevance of the final personalized set 210 selected. To do this, the subset may be selected according to a heuristic that can be used to efficiently identify which of all accessible content items 212 are most likely to be relevant to the target end-user. For example, the heuristic (recency heuristic) may select a number (e.g., tens or hundreds) of all accessible content items 212 that are most recently accessed by the target end-user using the content management system.

Alternatively, the heuristic (frequency heuristic) may select a number of all accessible content items 212 that are most frequently accessed by the target end-user using the content management system in a period of time (e.g., the past week, month, or year).

As yet another alternative, the heuristic (frequency heuristic) may select a number of all accessible content item 212 based on a combination of recency and frequency. For example, an initial set of candidate content items can be selected based on recency or frequency as above. The candidate content items are then ranked in order of weighted frequency where the weight applied to the frequency numerically decays based on recency of access (decays from more recently accessed to less recently accessed). In this way, a content item accessed five times in the past week might receive a higher ranking in the initial set than a content item accessed ten times two months ago. The final set of candidate content items can then be selected in rank order from the initial set of candidate content items.

The number of all accessible content items 212 selected for inclusion in the candidate set may vary from implementation to implementation and generally is a tradeoff between the computational latency of processing the candidate set through pipeline 200 including selecting, scoring, and ranking the candidate set of content items and the relevancy of the personalized set 210 of content items presented to the target end-user. Accordingly, the number of may be selected according to the requirements of the particular implementation at hand including based on the computing resources available to the particular implementation of pipeline 200.

At a next stage in pipeline 200, signals for each candidate content item are fetched from signal store 214 by signal fetching module 204. The signals fetched for a candidate content item from signal store 214 may vary from implementation to implementation but may reflect end-user activity or interaction with the candidate content item via the content management system. For example, the signals fetched for a candidate content item may include a recent (e.g., past few minutes, hours, days, weeks, or months) access history of the candidate content item such as opens, edits, comments, and shares of the candidate content item and which end-users accessed the content item, a content type of the content item, and the size of the content item. Signals about the target end-user may also be fetched from signal store 214 such as, for example, a current date or time and a type of end-user computing device used by the target end-user (e.g., mobile or non-mobile computing device). Other types of signals are possible and may vary from implementation to implementation. For example, content-based signals for the candidate content items may be fetched from signal store 214 by signal fetching module 204. Examples of content-based signals for a content item may include, but are not limited to, a content item name (e.g., a filename or a folder name) and text keywords extracted from, associated with, or determined based on the content item.

At a next stage in pipeline 200, the signals fetched by signal fetching module 204 from signal store 214 for the candidate set of content items selected are encoded as feature vectors for the candidate content items by feature encoding module 206. Generally, this feature encoding encompasses converting the fetched signals to vectors of floating-point numbers. As part of this encoding, the content type signals fetched for the candidate content items can be encoded as content type embeddings 216. Content type embeddings 216 may be pre-learned as described above prior to pipeline 200 processing. Thus, encoding a content type signal as a content type embedding by feature encoding module 206 can be as simple as looking up the content type embedding in content type embeddings 216 that is associated with an identifier of the content type signal. For example, content type embeddings 216 may encompass an index or data dictionary or other mapping from identifiers of content type signals to respective content type embeddings such that a lookup of a content type embedding for a given content type identifier is computationally efficient.

At a next stage in pipeline 200, the candidate content items are scored by candidate scoring module 208 using a machine learning content suggestion model such as a linear support vector machine or a neural network including a deep neural network. However, other types of machine learning models are possible and the machine learning content suggestion model is not limited to a linear support vector machine or a neural network. For example, the machine learning content suggestion model could be a linear regression model, as just one additional example. When scoring, the machine learning content suggestion model accepts as input the feature encodings including the content type embeddings obtained for the candidate content items by feature encoding module 206.

If a candidate content item scored by candidate scoring module 208 is a rare type of content item, then using the content type embedding as an input feature to the machine learning content suggestion model for the candidate content item can improve the accuracy of the score generated by the machine learning content suggestion model for the candidate content item of the rare type. This is possible even if the machine learning content suggestion model was trained with few or no representative training examples involving the rare type of content item if the machine learning content suggestion model was trained with representative training examples involving a common type of content item that is semantically similar to the rare type of content item (i.e., the content type embedding for the rare type is close in distance in the embedding space to the content type embedding for the common type). In effect, because the content type embedding for the rare type is used as an input feature to the machine learning content suggestion model when scoring the candidate content item, the candidate content item is scored by the machine learning content suggestion model almost as if it is the common type for which the machine learning content suggestion model was trained with representative training examples involving the common type of content item. As a result, the score generated for the candidate content item of the rare type by the machine learning content suggestion model may be more accurate than if other types of encodings of the content type are used as an input feature such as, for example, a one-hot encoding.

Candidate scoring model 208 ranks the candidate content items by the scores computed by the machine learning content suggestion model. The candidate content items (or representations thereof), or a selected subset thereof, are presented to the target end-user at the target end-user's computing device in rank order as personalized set 210 of suggested content items.

Modules 202, 204, 206, and 208 of pipeline 200 can execute in parallel. For example, candidate content item determination module 202 may determine set of candidate content items for the target end-user while signal fetching module 204 fetches signals for the candidate content items. Further, candidate scoring module 208 may score a candidate content item as soon as feature encoding module 206 has encoded the signals for the candidate content item as feature vectors and looked up the content type embedding for the content type of the candidate content item which may be before feature encoding module 206 has done this for all of the candidate content items determined by candidate content item determination module 202 for the target end-user.

Graph to Content Type Embeddings

Some examples of possible co-occurrence instances of content types in the content management system that can be counted for purposes of learning content type embeddings are described above. Those examples include folder co-occurrence instances, upload or synchronization session co-occurrence instances, and co-occurrence instances in a sharing operation. According to some embodiments, co-occurrence instances of content types are counted in filtered translated entity sequences sampled from graph data representing a "content management system" graph of entities and relationships between the entities in the content management system.

Figure 3:
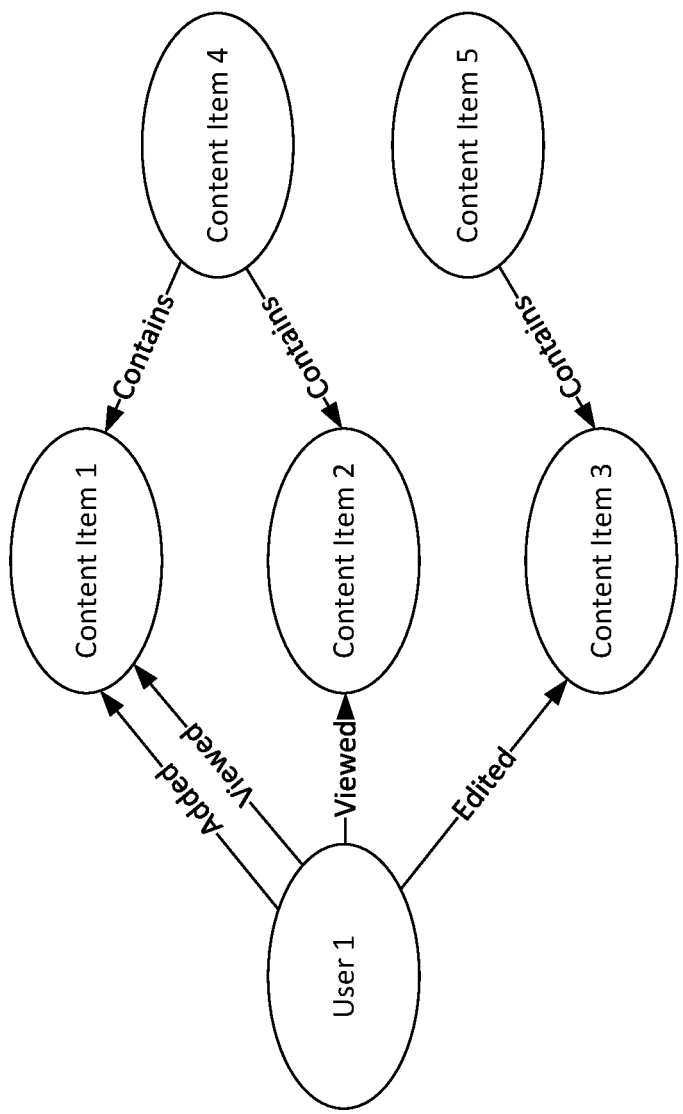
FIG. 3 depicts an example content management system graph, according to some embodiments.

Before describing how filtered translated entity sequences are sampled from the graph data and how co-occurrence instances of content types are counted in the filtered translated entity sequences, an example of a content management system graph of entities and relationships between the entities in the content management system is provided. In particular, FIG. 3 illustrates example content management system graph 300 of possible entities and relationships between the entities in graph data stored and maintained by the content management system. The graph data may include any data that can be represented as one or more directed graphs where the nodes of the directed graph(s) represent entities in the content management system and the directed edges between the nodes represent relationships between the entities. For example, in example content management system graph 300 there is a node User 1 representing a particular end-user of the content management system. Continuing the example, node User 1 has directed edges to nodes Content Item 1, Content Item 2, and Content Item 3. The directed edges from node User 1 to node Content Item 1 represent that end-user User 1 added content item Content Item 1 to the content management system and end-user User 1 viewed content item Content Item 1 using the content management system. The directed edge from node User 1 to content item Content Item 2 and the directed edge from node User 1 to content item Content Item 3 represent that end-user User 1 viewed content item Content Item 2 and edited content item Content Item 3 using the content management system, respectively. The directed edges from content item Content Item 4 to content item Content Item 1 and content item Content Item 2 represents that content item Content Item 4 contains Content Item 1 and Content Item 2 in the content management system. For example, Content Item 4 may be a folder content item. Likewise, for the directed edge from content item Content Item 5 to content item Content Item 3.

Example content management system graph 300 depicts just some possible entities and relationships that exist in the content management system. Other types of entities and relationships are possible. For example, the entities in the content management system represented in the content management system graph may include teams (e.g., a group of end-users), namespaces (e.g., a named collection of content items that is not a content item itself), sharable links (e.g., an end-user shareable link (e.g., URL or URL portion) to a content item), and online word processing documents (e.g., Dropbox™ Paper™ documents, Google™ Docs™, etc.) The relationships between the entities represented by directed edges in the content management system graph can be various, may depend on the types of entities being related, and no particular set of relationships is required. Some non-limiting examples of possible relationships are depicted in example content management system graph 300. Although example content management system graph 300 depicts only directed edges in one direction from each of the nodes, the entities can have bi-directional relationships represented in the content management system graph. For example, a directed edge from node Content Item 2 to node User 1 may represent that the content item Content Item 2 is shared with end-user User 1 in the content management system.

According to some embodiments, content type embeddings are created for content types of content items in the content management system graph. In particular, a corpus of filtered translated entity sequences is generated from the graph. A filtered translated entity sequence is an entity sequence generated from the graph where non-content item entities and folder content items in the entity sequence are removed from the entity sequence and the remaining file content item entities are translated to content types. The result is a filtered translated entity sequence having a sequence of content types.

Figure 4:
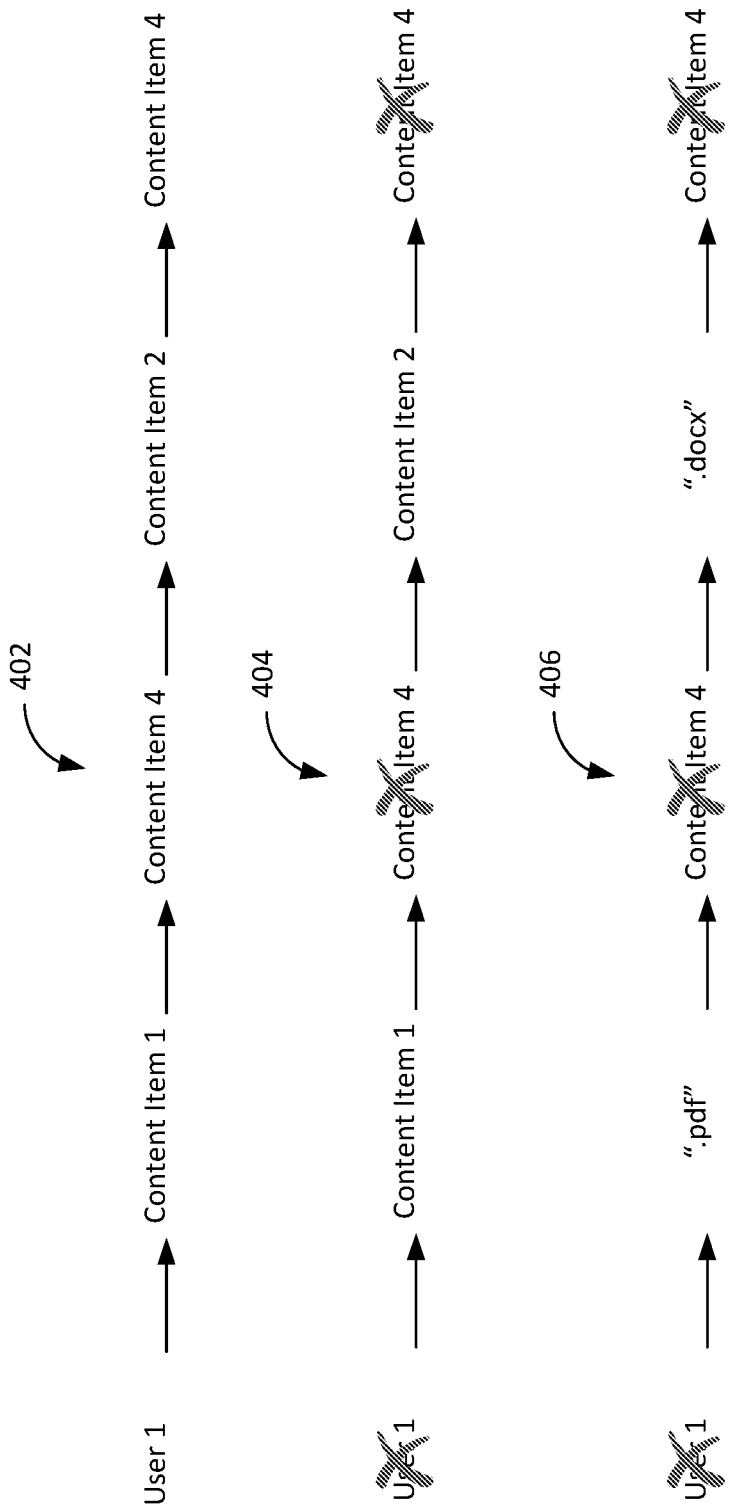
FIG. 4 illustrates an example of filtered and translating an entity sequence generated from a content management system graph, according to some embodiments.

The entity sequences that are filtered and translated can be generated from the content management system graph according to an entity sequence sampling strategy that is described in greater detail below. However, FIG. 4 illustrates an example of filtering and translating entity sequence 402 generated from graph 300 of FIG. 3, according to some embodiments. Entity sequence 402 is generated from graph 300 according to a sampling strategy. Filtered entity sequence 404 removes non-content item entities (e.g., User 1) and folder content item entities (e.g., Content Item 4) from entity sequence 402. Filtered translated entity sequence 406 translates the remaining file content item entities to content types that the file content item entities are. In this example, content item Content Item 1 is translated to content type ".pdf" representing the Adobe™ Portable Document Format (PDF) content type and file content item Content Item 2 is translated to ".docx" representing the Microsoft™ Word™ format content type.

In the example on FIG. 4, content types of file content item entities are represented by character string data corresponding to the file extensions of the file content item entities. For example, an identifier of the content item entity can be used to look up in a lookup table, database, or the like, the file extension associated with the content item. However, other representations are possible. For example, a numerical or binary data type identifier may be used to represent the content type in a filtered translated entity sequence instead of or in addition to a character string representation. Also note that while the character string representations of file extension in the example provided include a leading dot ('.') character as in, for example, ".jpeg", the character string represent can omit the leading dog ('.') character as in, for example, "jpeg".

Multiple entity sequences can be generated from the content management system graph according to a sample strategy. Each of the generated entity sequences can be filtered and translated to produce a corpus of filtered translated entity sequences. Content type embeddings can then be learned based on the corpus of filtered translated entity sequences. According to some embodiments, the content type embeddings are learned according to a technique for computing numeric representations of words in a multi-dimensional space such as the technique described in U.S. Pat. No. 9,037,465, entitled "Computing Numeric Representations of Words in a High-Dimensional Space," the entire contents of which is incorporated by reference as if fully set forth herein. The technique is referenced patent document is commonly known as Word2Vec and uses a skip-gram neural network model to generate words embeddings from a corpus of text sentences. The Word2Vec technique can be adapted to learn content type embeddings by treating the character string representations of content types in the filtered translated entity sequences generated from the content management system graph as words and the filtered translated entity sequences of the corpus as sentences. Further, the dimensionality of the content type embeddings may be reduced accordingly because the size of the vocabulary of content types is much lower than the size of the vocabulary of a spoken language such as English. While the Word2Vec technique can be adapted to learn content type embeddings from a corpus of filtered translated entity sequence generated from the content management system graph, other techniques for learning word embeddings can be adapted analogously such as, for example, the unsupervised machine learning algorithm for obtained vector representations for words described in the paper by Jeffrey Pennington, Richard Socher, and Christopher D. Manning, "Glove: Global Vectors for Word Representation," Proceedings of the 2014 Conference on Empirical Methods in Natural Language Processing (EMNLP), Association for Computational Linguistics, Pages 1532-1543, 2014, the entire contents of which is hereby incorporated by reference as is fully set forth herein.

According to some embodiments, the sampling strategy for generating entity sequences from the content management system graph is based on the sampling strategy for generated sentences from a graph as described in the paper by Aditya Grover and Jure Leskovec, "node2vec: Scalable Feature Learning for Networks," ACM SIGKDD International Conference on Knowledge Discovery and Data Mining (KDD), 2016, the entire contents of which is hereby incorporated by reference as if fully set forth herein. The sampling strategy described in this paper is sometimes referred to as "node2vec."

In general, the node2vec sampling strategy as adapted for sampling entity sequences from the content management system graph or a selected sub-graph thereof for the purpose of learning content type embeddings may accept a number of parameters or arguments of a computer-implemented function that implements the adapted sampling strategy:

number of walks: This parameter specifies the number of random walks to be generated from each node in the content management system graph or the selected sub-graph thereof.

walk length: This parameter specifies how many nodes of the content management system graph of the selected sub-graph thereof to include in each random walk.

P: Return hyperparameter.

Q: In-Out hyperparameter.

In addition to these parameters, standard skip-gram parameters may be specified such as, for example, context window size, number of iterations, etc.

According to the sampling strategy, for each node in the content management system graph or the selected sub-graph thereof, number of walks entity sequences are generated where each such entity sequence has walk length. The parameters P and Q control interpolation between a breadth first walk and depth-first walk on random walks as described in the node2vec paper referenced above.

According to some embodiments, a co-occurrence instance in matrix $\beta$ is counted for the content type pair $ct_i$ and $ct_j$ when both content type $ct_i$ and content type $ct_j$ occur in a filtered translated entity sequence generated from the content management system graph or the selected sub-set thereof. In this way, the sampling strategy for generating filtered translated entity sequences from the content management system graph or the selected sub-set thereof can be used to generated co-occurrence instance counts in matrix $\beta$ from which the generative model-based content type embedding learning process described above can be used to generate content type embeddings.

Computing System Implementation

Some embodiments may encompass performance of a method by a computing system having one or more processors and storage media. The one or more processors and the storage media may be provided by one or more computing devices. The storage media of the computing system can store one or more computer programs. The one or more programs may include instructions configured to perform the method. The instructions may be executed by the one or more processors to perform the method.

Some embodiments may encompass one or more non-transitory computer-readable media. The one or more non-transitory computer-readable media may store the one or more computer programs that include the instructions configured to perform the method.

Some embodiments may encompass the computing system having the one or more processors and the storage media storing the one or more computer programs that include the instructions configured to perform the method.

Some embodiments may encompass one or more virtual machines that logically operate on top of one or more computing devices and emulate computing hardware. A virtual machine can be a Type-1 or Type-2 hypervisor, for example. Operating system virtualization using containers is also possible instead of, or in conjunction with, computing hardware virtualization using hypervisors.

Some embodiments encompass multiple computing devices. The computing devices may be arranged in a distributed, parallel, clustered or other suitable multi-node computing configuration in which computing devices are continuously, periodically, or intermittently interconnected by one or more data communications networks (e.g., one or more Internet Protocol (IP) networks.) Further, it need not be the case that the set of computing devices that execute the instructions be the same set of computing devices that provide the storage media storing the one or more computer programs, and the sets may only partially overlap or may be mutually exclusive. For example, one set of computing devices may store the one or more computer programs from which another, different set of computing devices downloads the one or more computing devices and executes the instructions thereof.

Computing Device

Figure 5:
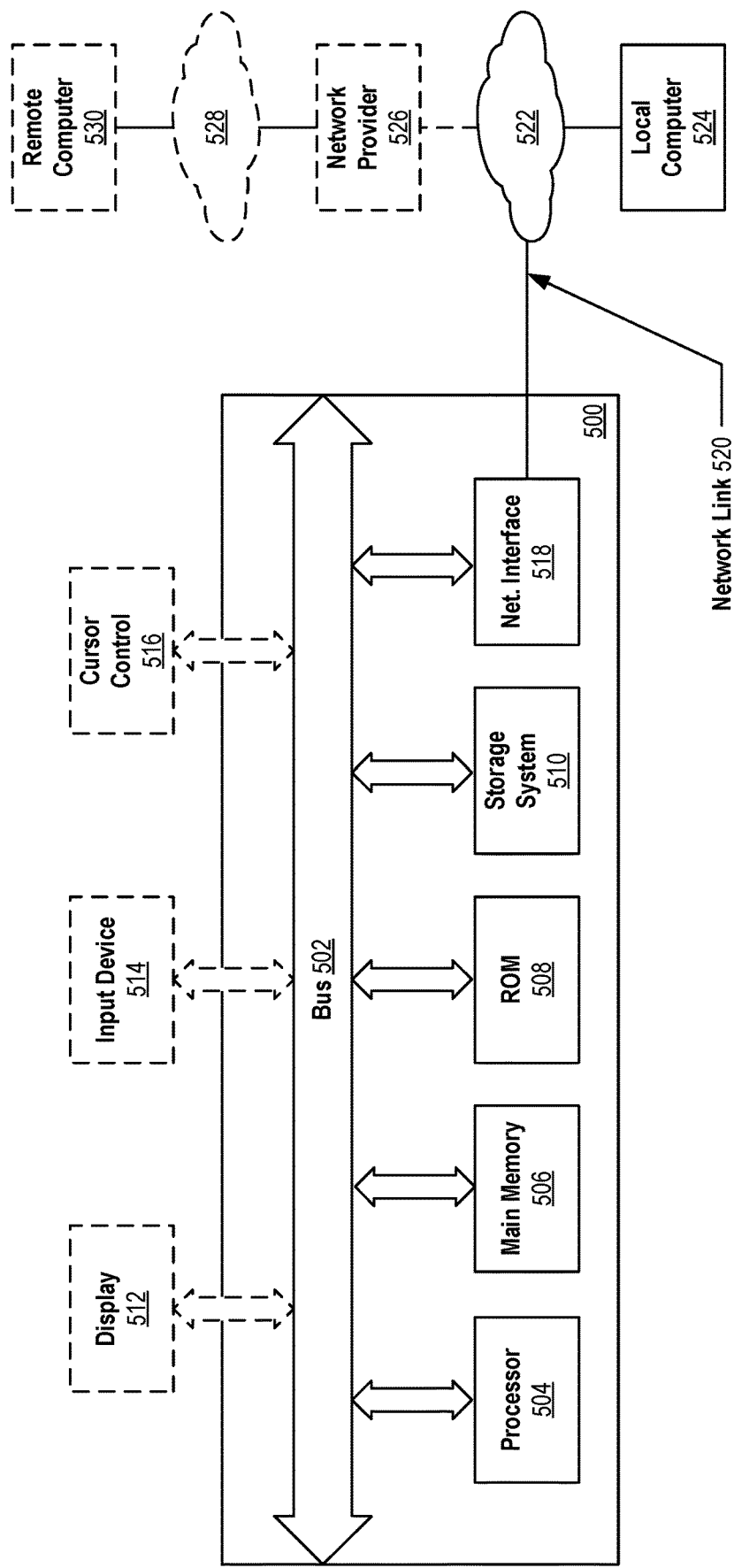
FIG. 5 illustrates an example computing device, according to some embodiments.

FIG. 5 is a block diagram of a computing device 500, according to some embodiments of the present invention. Computing device 500 may include bus 502 or other communication mechanism for communicating information, and one or more hardware processors 504 coupled with bus 502 for processing information.

Hardware processor 504 may include, for example, one or more general-purpose microprocessors, central processing units (CPUs) or cores thereof, graphics processing units (GPUs), or systems on a chip (SoCs).

Computing device 500 may also include a main memory 506, typically implemented by one or more volatile memory devices, coupled to bus 502 for storing information and instructions to be executed by processor 504. Main memory 506 also may be used for storing temporary variables or other intermediate information during execution of instructions by processor 504.

Computing device 500 may also include read-only memory (ROM) 508 or other static storage device coupled to bus 502 for storing static information and instructions for processor 504.

A storage system 510 implemented by one or more non-volatile memory devices may be provided and coupled to bus 502 for storing information and instructions.

Computing device 500 may be coupled via bus 502 to display 512, such as a liquid crystal display (LCD), a light emitting diode (LED) display, or a cathode ray tube (CRT), for displaying information to a computer user. Display 512 may be combined with a touch sensitive surface to form a touch screen display. The touch sensitive surface may be an input device for communicating information including direction information and command selections to processor 504 and for controlling cursor movement on display 512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 514, including alphanumeric and other keys, may be coupled to bus 502 for communicating information and command selections to processor 504.

Another type of user input device may be cursor control 516, such as a mouse, a trackball, or cursor direction keys for communicating direction information and command selections to processor 504 and for controlling cursor movement on display 512. This input device may have two degrees of freedom in two axes, a first axis (e.g., x) and a second axis (e.g., y), that allows the device to specify positions in a plane.

Instructions, when stored in non-transitory storage media accessible to processor 504, such as, for example, main memory 506 or storage system 510, may render computing device 500 into a special-purpose machine that is customized to perform the operations specified in the instructions. Alternatively, customized hard-wired logic, one or more ASICs or FPGAs, firmware and/or hardware logic which in combination with the computing device may cause or program computing device 500 to be a special-purpose machine.

A computer-implemented process may be performed by computing device 500 in response to processor 504 executing one or more sequences of one or more instructions contained in main memory 506. Such instructions may be read into main memory 506 from another storage medium, such as storage system 510. Execution of the sequences of instructions contained in main memory 506 may cause processor 504 to perform the process. Alternatively, hardwired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 510) and/or volatile media (e.g., main memory 506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 502. Transmission media can also take the form of acoustic or light waves, such as those generated during radio-wave and infra-red data communications.

Computing device 500 may also include a network interface 518 coupled to bus 502. Network interface 518 may provide a two-way data communication coupling to a wired or wireless network link 520 that is connected to a local, cellular or mobile network 522. For example, communication interface 518 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Communication interface 518 may send and receive electrical, electromagnetic or optical signals that carry digital data streams representing various types of information.

Network link 520 may provide data communication through one or more networks to other data devices. For example, network link 520 may provide a connection through network 522 to local computing device 524 that is also connected to network 522 or to data communication equipment operated by a network access provider 526 such as, for example, an internet service provider or a cellular network provider. Network access provider 526 in turn may provide data communication connectivity to another data communications network 528 (e.g., the internet). Networks 522 and 528 both may use electrical, electromagnetic or optical signals that carry digital data streams. The signals through the various networks and the signals on network link 520 and through communication interface 518, which carry the digital data to and from computing device 500, are example forms of transmission media.

Computing device 500 may send messages and receive data, including program code, through the networks 522 and 528, network link 520 and communication interface 518. In the internet example, a remote computing device 530 may transmit a requested code for an application program through network 528, network 522 and communication interface 518. The received code may be executed by processor 504 as it is received, and/or stored in storage device 510, or other non-volatile storage for later execution.

Conclusion

In the foregoing detailed description, some embodiments of the present invention have been described with reference to numerous specific details that may vary from implementation to implementation. The detailed description and the figures are, accordingly, to be regarded in an illustrative rather than a restrictive sense.

A reference in the detailed description to some embodiments of the present invention is not intended to mean that an embodiment is exclusive of another described embodiment of the present invention, unless the context clearly indicates otherwise. Thus, a described embodiment of the present invention may be combined with one or more other described embodiments of the present invention in a particular implementation, unless the context clearly indicates otherwise.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. A computer-implemented method comprising:
generating a corpus of entity sequences comprising a plurality of content items in a content management system that are associated with a plurality of content types and that satisfy a recency heuristic indicating a recency of access within a period of time;
filtering the corpus of entity sequences to generate filtered entity sequences comprising a subset of the plurality of content items by removing non-content item entities from the corpus of entity sequences;
determining a plurality of pairwise co-occurrence instance counts for the plurality of content types reflecting pairwise co-occurrence instances among the plurality of content types in the filtered entity sequences;
generating a plurality of content type embeddings for the filtered entity sequences based on the plurality of pairwise co-occurrence instance counts;

counting, as one of the plurality of pairwise co-occurrence instance counts, a co-occurrence instance count for a first instance of a pair of different content types co-occurring in a same content item sharing operation facilitated by the content management system;

counting, as one of the plurality of pairwise co-occurrence instance counts, a co-occurrence instance count for a second instance of a pair of different content types co-occurring in a folder of a centrally-hosted network filesystem of the content management system based on the pair of different content types being contained in the folder of the centrally-hosted network filesystem for an amount of time;

weighing, in the plurality of pairwise co-occurrence instance counts, the co-occurrence instance count for first instance and the co-occurrence instance count for second instance numerically differently based on a type of co-occurrence instance count for the first instance and a type of co-occurrence instance count for the second instance;

generating magnitudes of distances in a multi-dimensional embedding space between the plurality of content type embeddings corresponding to a semantic similarity between the filtered entity sequences; and providing, for display on a client device and based on the magnitudes of distances between the plurality of content type embeddings, a content item suggestion that references at least one particular content item.

2. The computer-implemented method of claim 1, further comprising:

counting, as one of the plurality of pairwise co-occurrence instance counts, an instance of a pair of different content types co-occurring in a folder of a centrally-hosted network filesystem of the content management system based on the pair of different content types being contained in the folder of the centrally-hosted network filesystem for a threshold amount of time, wherein the centrally-hosted network filesystem is hierarchical with multiple folders located hierarchically with a parent folder and a child folder and the pair of different content types are contained in the folder of the centrally-hosted network filesystem for a threshold amount of time.

3. The computer-implemented method of claim 1, further comprising counting, as one of the plurality of pairwise co-occurrence instance counts, an instance of a pair of different content types that are not functionally integrated co-occurring in a same content item upload session or synchronization session associated with the content management system based on being uploaded or synchronized within a threshold amount of time.

4. The computer-implemented method of claim 1, further comprising counting, as one of the plurality of pairwise co-occurrence instance counts, an instance of a pair of different content types co-occurring in a same filtered translated entity sequence generated from a content management system graph, or a sub-graph thereof.

5. The computer-implemented method of claim 1, further comprising learning the plurality of content type embeddings based on a generative model according to a generative process.

6. The computer-implemented method of claim 1, further comprising using a particular content type embedding of the plurality of content type embeddings as an input machine learning feature to a machine learning content suggestion model to make a prediction about a particular content item, the particular content item being a particular content type, the particular content type represented by the particular content type embedding.

7. The computer-implemented method of claim 1, wherein determining the plurality of pairwise co-occurrence instance counts for the plurality of content types is based on a random sampling of co-occurrence data collected during a period of time.

8. One or more non-transitory computer-readable media storing one or more computer programs having instructions which, when executed by a computing system having one or more processors, cause the computing system to:

generate filtered entity sequences comprising a subset of a plurality of content items by filtering a corpus of entity sequences to satisfy a recency heuristic indicating a recency of access within a period of time and filtering by removing non-content item entities from the corpus of entity sequences, wherein the corpus of entity sequences comprises a plurality of content items in a content management system that are associated with a plurality of content types;

generate a plurality of content type embeddings for the filtered entity sequences based on pairwise co-occurrence instances among the plurality of content types in the filtered entity sequences;

count, as one of the pairwise co-occurrence instances, a co-occurrence instance for a first instance of a pair of different content types co-occurring in a same content item sharing operation facilitated by the content management system;

count, as one of the pairwise co-occurrence instances, a co-occurrence instance count for a second instance of a pair of different content types co-occurring in a folder of a centrally-hosted network filesystem of the content management system based on the pair of different content types being contained in the folder of the centrally-hosted network filesystem for an amount of time;

weigh, in the pairwise co-occurrence instances, the co-occurrence instance for first instance and the co-occurrence instance for second instance numerically differently based on a type of co-occurrence instance for the first instance and a type of co-occurrence instance for the second instance;

train a machine learning content suggestion model based on a set of training examples, the set of training examples having the plurality of content type embeddings as machine learning features of the set of training examples, wherein a magnitude of a distance in a multi-dimensional embedding space between a pair of content type embeddings, of the plurality of content type embeddings, corresponds to a semantic similarity between a pair of content types, of the plurality of content types, represented by the pair of content type embeddings; and use a particular content type embedding of the plurality of content type embeddings as an input machine learning feature to a machine learning content suggestion model to make a prediction about a particular content item, the particular content item being a particular content type, the particular content type represented by the particular content type embedding.

9. The one or more non-transitory computer-readable media of claim 8, further comprising instructions, that when executed by the computing system, cause the computing system to:

store a plurality of pairwise co-occurrence instance counts for a plurality of content types reflecting pairwise co-occurrence instances in a content management system among the plurality of content types; and learn the plurality of content type embeddings for the plurality of content types based on the plurality of pairwise co-occurrence instance counts.

10. The one or more non-transitory computer-readable media of claim 9, further comprising instructions, that when executed by the computing system, cause the computing system to count, as one of the plurality of pairwise co-occurrence instance counts, an instance of a pair of different content types co-occurring in a folder of a centrally-hosted network filesystem of the content management system, wherein the centrally-hosted network filesystem is hierarchical with multiple folders located hierarchically with a parent folder and a child folder and the pair of different content types are contained in the child folder of the centrally-hosted network filesystem for a threshold amount of time.

11. The one or more non-transitory computer-readable media of claim 9, further comprising instructions, that when executed by the computing system, cause the computing system to count, as one of the plurality of pairwise co-occurrence instance counts, an instance of a pair of different content types that are not functionally integrated co-occurring in a same content item upload session or synchronization session associated with the content management system based on being uploaded or synchronized within a threshold amount of time.

12. The one or more non-transitory computer-readable media of claim 9, further comprising instructions, that when executed by the computing system, cause the computing system to count, as one of the plurality of pairwise co-occurrence instance counts, an instance of a pair of different content types co-occurring in a same filtered translated entity sequence generated from a content management system graph, or a sub-graph thereof.

13. The one or more non-transitory computer-readable media of claim 9, further comprising instructions, that when executed by the computing system, cause the computing system to learn the plurality of content type embeddings based on a generative model according to a generative process.

14. The one or more non-transitory computer-readable media of claim 8, further comprising instructions, that when executed by the computing system, cause the computing system to:

use an additional content type embedding of the plurality of content type embeddings as an additional input machine learning feature to the machine learning content suggestion model to make an additional prediction about the particular content item, the particular content item being associated with an additional content type, the additional content type represented by the additional content type embedding.

15. A computing system, comprising:
one or more processors;
storage media; and
one or more programs stored in the storage media, the one or more programs having instructions which, when executed by the one or more processors, cause the computing system to:
generate a corpus of entity sequences comprising a plurality of content items in a content management system that are associated with a plurality of content types and that satisfy a recency heuristic indicating a recency of access within a period of time;

filter the corpus of entity sequences to generate filtered entity sequences comprising a subset of the plurality of content items by removing non-content item entities from the corpus of entity sequences;

determine a plurality of pairwise co-occurrence instance counts for the plurality of content types reflecting pairwise co-occurrence instances among the plurality of content types in the filtered entity sequences;

generate a plurality of content type embeddings for the filtered entity sequences based on the plurality of pairwise co-occurrence instance counts;

count, as one of the plurality of pairwise co-occurrence instance counts, a co-occurrence instance count for a first instance of a pair of different content types co-occurring in a same content item sharing operation facilitated by the content management system;

count, as one of the plurality of pairwise co-occurrence instance counts, a co-occurrence instance count for a second instance of a pair of different content types co-occurring in a folder of a centrally-hosted network filesystem of the content management system based on the pair of different content types being contained in the folder of the centrally-hosted network filesystem for an amount of time;

weigh, in the plurality of pairwise co-occurrence instance counts, the co-occurrence instance count for first instance and the co-occurrence instance count for second instance numerically differently based on a type of co-occurrence instance count for the first instance and a type of co-occurrence instance count for the second instance;

generate magnitudes of distances in a multi-dimensional embedding space between the plurality of content type embeddings, corresponding to a semantic similarity the filtered entity sequences;

train a machine learning content suggestion model based on a set of training examples, the set of training examples having the plurality of content type embeddings as machine learning features of the set of training examples; and use a particular content type embedding of the plurality of content type embeddings as an input machine learning feature to a machine learning content suggestion model to make a prediction about a particular content item, the particular content item being a particular content type, the particular content type represented by the particular content type embedding.

16. The computing system of claim 15, further comprising instructions, that when executed by the one or more processors, cause the computing system to count, as one of the plurality of pairwise co-occurrence instance counts, an instance of a pair of different content types co-occurring in a folder of a centrally-hosted network filesystem of the content management system, wherein the centrally-hosted network filesystem is hierarchical with multiple folders located hierarchically and the pair of different content types are contained in the folder of the centrally-hosted network filesystem for an amount of time.

17. The computing system of claim 15, further comprising instructions, that when executed by the one or more processors, cause the computing system to count, as one of the plurality of pairwise co-occurrence instance counts, an instance of a pair of different content types co-occurring in a same content item upload or synchronization session associated with the content management system based on being uploaded or synchronized within a threshold amount of time.

18. The computing system of claim 15, further comprising instructions, that when executed by the one or more processors, cause the computing system to count, as one of the plurality of pairwise co-occurrence instance counts, an instance of a pair of different content types co-occurring in a same content item sharing operation facilitated by the content management system.

19. The computing system of claim 15, further comprising instructions, that when executed by the one or more processors, cause the computing system to count, as one of the plurality of pairwise co-occurrence instance counts, an instance of a pair of different content types co-occurring in a same filtered translated entity sequence generated from a content management system graph, or a sub-graph thereof.

20. The computing system of claim 15, further comprising instructions, that when executed by the one or more processors, cause the computing system to learn the plurality of content type embeddings based on a generative model according to a generative process.

\* \* \* \* \*